United States Patent
Sehara et al.

(10) Patent No.: US 7,870,463 B2
(45) Date of Patent: Jan. 11, 2011

(54) OPTICAL DISC RECORDING AND PLAYBACK APPARATUS

(75) Inventors: Shunsuke Sehara, Osaka (JP); Yasunori Kuwayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 270 days.

(21) Appl. No.: 12/289,086

(22) Filed: Oct. 20, 2008

(65) Prior Publication Data

US 2009/0110374 A1 Apr. 30, 2009

(30) Foreign Application Priority Data

Oct. 29, 2007 (JP) ............................. 2007-279901

(51) Int. Cl.
*G11C 29/00* (2006.01)
(52) U.S. Cl. ................. 714/769; 369/44.28; 369/44.34; 369/44.41
(58) Field of Classification Search ................. 714/769; 369/44.28, 44.34, 44.41
See application file for complete search history.

(56) References Cited

U.S. PATENT DOCUMENTS

| | | | | |
|---|---|---|---|---|
| 4,700,056 A | * | 10/1987 | Silvy et al. ............... | 369/44.28 |
| 4,870,370 A | * | 9/1989 | Hedberg et al. ............. | 330/133 |
| 5,040,194 A | * | 8/1991 | Tjahjadi et al. ............. | 375/345 |
| 5,225,755 A | * | 7/1993 | Okamoto .................... | 318/685 |
| 5,260,956 A | * | 11/1993 | Inaba et al. ............... | 372/38.07 |
| 5,418,795 A | * | 5/1995 | Itakura et al. ............... | 714/746 |
| 5,477,557 A | * | 12/1995 | Inaba et al. ............... | 372/38.02 |
| 6,181,738 B1 | * | 1/2001 | Chheda et al. ............... | 375/224 |
| 6,546,518 B1 | * | 4/2003 | Leung et al. ................ | 714/769 |
| 6,741,532 B1 | * | 5/2004 | Graba et al. ............. | 369/44.28 |
| 6,791,776 B2 | * | 9/2004 | Kato et al. .................... | 360/39 |
| 2001/0043416 A1 | * | 11/2001 | Kato et al. .................... | 360/40 |
| 2005/0041316 A1 | * | 2/2005 | Kato et al. .................... | 360/39 |
| 2005/0180279 A1 | | 8/2005 | Sogawa et al. | |

FOREIGN PATENT DOCUMENTS

JP 2005-228366 8/2005

* cited by examiner

*Primary Examiner*—M. Mujtaba K Chaudry
(74) *Attorney, Agent, or Firm*—Morgan Lewis & Bockius LLP (57) ABSTRACT

A DSP of a DVD recorder includes: a gain setting portion determining appropriate values of a first gain α and a second gain β when playback of an optical disc is performed, recording the first gain α and the second gain β thus determined in a gain storing portion, and setting them in a main differential amplifier and a sub differential amplifier, respectively; and a correction performing portion reading, when recording on the optical disc is performed, the first gain α and the second gain β stored in the gain storing portion, correcting at least one of them, and setting them in the main differential amplifier and the sub differential amplifier, respectively.

5 Claims, 8 Drawing Sheets

OPTICAL DISC RECORDING AND PLAYBACK APPARATUS

This application is based on Japanese Patent Application No. 2007-279901 filed on Oct. 29, 2007, and the contents of which are hereby incorporated by reference.

BACKGROUND OF THE INVENTION

1. Field of the Invention

The present invention relates to optical disc recording and playback apparatuses provided with a laser light source irradiating an optical disc with laser light and an optical pickup converting reflected light from the optical disc into a plurality of electrical signals via a split photo detector, the optical disc recording and playback apparatuses recording information on the optical disc, and reading information stored in the optical disc and playing back the information thus read. In particular, the present invention relates to an optical disc recording and playback apparatus performing recording on and playback from a DVD (Digital Versatile Disc) having two recordable layers: a zeroth layer and a first layer.

2. Description of Related Art

Conventionally, in optical disc recording and playback apparatuses provided with a laser light source irradiating an optical disc with laser light and an optical pickup converting reflected light from the optical disc into a plurality of electrical signals via a split photo detector, the optical disc recording and playback apparatuses recording information on the optical disc, and reading information stored in the optical disc and playing back the information thus read, a tracking servo method is adopted as a control method for making the laser light emitted from the optical pickup accurately follow a track formed on the optical disc. As the tracking servo method, a DPP (differential push pull) method is known, by which a tracking error signal is produced by performing computation on output signals of light receiving elements, the output signals obtained from one main beam and two sub beams reflected from the optical disc.

In order to improve accuracy of tracking servo using the DPP method, various apparatuses, methods, or the like, have been proposed. For example, JP-A-2005-228366 discloses an optical disc recording and playback apparatus in which a gain value allowable range setting portion sets the allowable range of gain values by actual measurement of gain value corresponding to ratio of level of an MPP (main push pull) signal and level of an SPP (sub push pull) signal, both of which are produced by a tracking error signal computing circuit, and an eccentricity measuring portion measures degree of eccentricity of the optical disc, and sets a gain value of an amplifier based on the degree of eccentricity thus measured.

However, although the above optical disc recording and playback apparatus can improve the accuracy of tracking servo, in case where recording is performed by using the gain value set at the time of playback, the accuracy of tracking servo may be reduced because intensity of laser light shone onto the optical disc is different when playback is performed and when recording is performed.

In particular, in a case where recording is performed on a DVD having two recordable layers: a zeroth layer and a first layer, the balance of a tracking error signal may be disrupted (see FIG. 7B) due to, for example, influence of interfering light from adjacent layers, causing instability of tracking servo.

SUMMARY OF THE INVENTION

In view of the conventionally experienced problems described above, an object of the present invention is to provide an optical disc recording and playback apparatus that can stabilize accuracy of tracking servo.

To achieve the above object, according to one aspect of the present invention, an optical disc recording and playback apparatus including: a laser light source irradiating an optical disc with laser light; and an optical pickup converting reflected light from the optical disc into a plurality of electrical signals via a split photo detector, the optical disc recording and playback apparatus recording information on the optical disc, and reading information stored in the optical disc and playing back the read information. Here, the optical disc recording and playback apparatus is provided with: a first signal generating portion producing a first error signal from the plurality of electrical signals corresponding to a main beam of the reflected light, multiplying the first error signal by a previously set first gain, and outputting a resultant signal; a second signal generating portion producing a second error signal from the plurality of electrical signals corresponding to a sub beam of the reflected light, multiplying the second error signal by a previously set second gain, and outputting a resultant signal; a third signal generating portion producing a tracking error signal by obtaining a difference between the first error signal and the second error signal by subtracting the second error signal from the first error signal; a gain storing portion previously storing the first gain and the second gain; a gain setting portion determining appropriate values of the first gain and the second gain when playback of the optical disc is performed, and recording the first gain and the second gain thus determined in the gain storing portion and setting the first gain and the second gain in the first signal generating portion and the second signal generating portion, respectively; and a correction performing portion reading, when recording on the optical disc is performed, the first gain and the second gain stored in the gain storing portion, correcting at least one of the first gain and the second gain, and setting the first gain and the second gain in the first signal generating portion and the second signal generating portion, respectively.

With this configuration, when playback of the optical disc is performed, the appropriate values of the first gain and the second gain are determined, and the first gain and the second gain thus determined are recorded in the gain storing portion and set in the first signal generating portion and the second signal generating portion, respectively; when recording on the optical disc is performed, the first gain and the second gain stored in the gain storing portion are read, and, after at least one of them is corrected, they are set in the first signal generating portion and the second signal generating portion, respectively. As a result, by performing appropriate correction, it is possible to make the first gain and the second gain have an appropriate value even when recording on the optical disc is performed. This helps stabilize the accuracy of tracking servo.

Preferably, the correction performing portion corrects the first gain by multiplying the first gain stored in the gain storing portion by a predetermined correction value, and sets the first gain thus corrected in the first signal generating portion.

As a result, by setting the correction value at an appropriate value, it is possible to stabilize the accuracy of tracking servo with a simple configuration.

Preferably, the predetermined correction value is a value in the range of 0.88 to 0.92.

That is, in a case where recording is performed on the optical disc, using the gain value set at the playback for recording causes disruption of a balance of the tracking error signal. To avoid this, the first gain is corrected by multiplying it by a correction value set in the range of 0.88 to 0.92. This makes it possible to obtain an appropriate tracking error signal, and thus makes it possible to stabilize the accuracy of tracking servo with a simple configuration.

Preferably, in the optical disc recording and playback apparatus according to the present invention, the correction performing portion corrects the second gain by multiplying the second gain stored in the gain storing portion by a predetermined correction value, and sets the second gain thus corrected in the second signal generating portion.

That is, depending on the configuration of the optical disc recording and playback apparatus according to the present invention, it may be more efficient to correct the second gain and set the second gain thus corrected in the second signal generating portion. In that case, it is possible to stabilize the accuracy of tracking servo with a simple configuration.

Preferably, in the optical disc recording and playback apparatus according to the present invention, the optical disc is a DVD (Digital Versatile Disc) having two recordable layers: a zeroth layer and a first layer.

In the case of a DVD having two recordable layers, the balance of the tracking error signal is easily disrupted at the time of recording due to, for example, the influence of interfering light from adjacent layers. To avoid this, at least one of the first gain and the second gain is corrected. This helps further stabilize the accuracy of tracking servo.

DETAILED DESCRIPTION OF PREFERRED EMBODIMENTS

Figure 1:
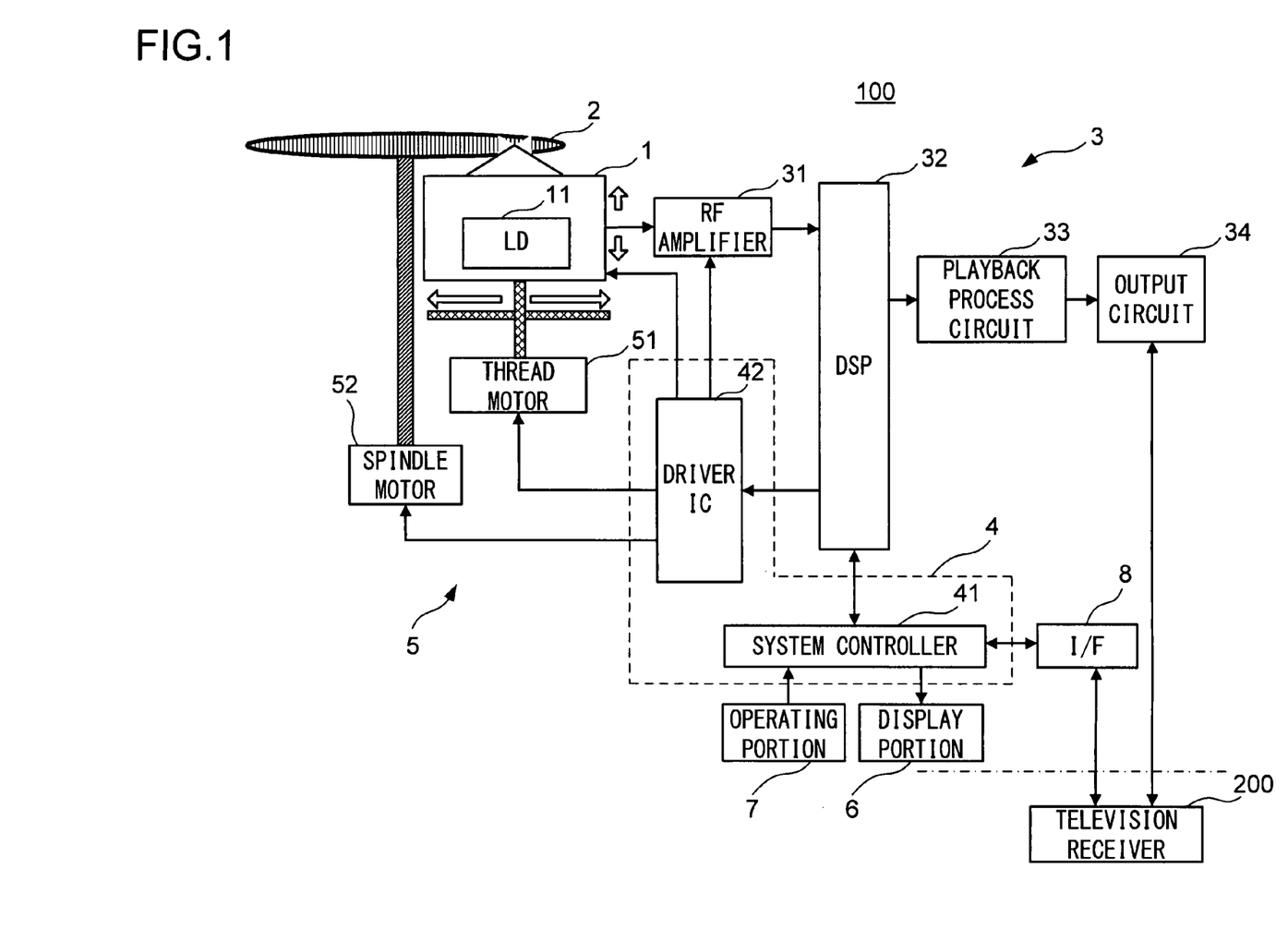
FIG. 1 is a configuration diagram to show an example of a DVD recorder according to the invention.

Hereinafter, an embodiment of the present invention will be described with reference to the accompanying drawings. FIG. 1 is a configuration diagram to show an example of a DVD recorder according to the invention. A DVD recorder 100 (corresponding to an optical disc recording and playback apparatus) includes an optical pickup 1, an output device 3, a control device 4, a drive device 5, a display portion 6, and an operation portion 7.

In addition, the DVD recorder 100 is so configured as to communicate with a television receiver 200. The television receiver 200 is fitted with a speaker and a monitor (of which none is illustrated). The television receiver 200 outputs information from the DVD recorder 100, such as sound information and image information, via the speaker and the monitor, and receives television broadcast and outputs the received information, such as sound information and image information, to the DVD recorder 100 via an interface portion 8.

The optical pickup 1 is provided with an LD (laser diode) 11. The optical pickup 1 irradiates the optical disc 2 with laser light from the LD 11 for recording various information, such as sound information and image information, on the optical disc 2, and reading various information, such as sound information and image information, stored in the optical disc 2. Moreover, the optical pickup 1 produces a tracking error signal by converting reflected light from an optical disc 2 to be played back into a plurality of electrical signals via a split photo detector 16 (see FIG. 2), and thereby performs tracking servo control (control for making the light accurately follow a track formed on the optical disc 2).

The LD 11 (corresponding to a laser light source) irradiates the optical disc 2 with laser light with which various information, such as sound information and image information, is recorded on the optical disc 2 and information stored in the optical disc 2 is read therefrom. Moreover, the optical pickup 1 is configured so as to be movable by a thread motor 51 in the direction of the radius of the optical disc 2 and in the vertical direction toward and away from the optical disc 2.

The optical disc 2 here is a so-called DL (dual-layer) DVD (Digital Versatile Disc) having two recordable layers: a zeroth layer and a first layer.

The output device 3 converts information such as sound information and image information from the optical pickup 1 into sound and images, and outputs the resultant sound and images to the unillustrated speaker and monitor, respectively, of the television receiver 200. The output device 3 includes an RF (radio frequency) amplifier 31, a DSP (digital signal processor) 32, a playback process circuit 33, and an output circuit 34. The RF amplifier 31 amplifies a signal corresponding to the sound information, image information, or the like, from the optical pickup 1.

The DSP 32 and the playback process circuit 33 perform various information processing for playback (for example, image processing) for the signal from the RF amplifier 31. In addition, the DSP 32 records (writes) information, such as image information and sound information, received from the television receiver 200 via a system controller 41 on the optical disc 2 via a driver IC 42, the optical pickup 1, or the like. The output circuit 34 performs processing such as DA conversion for outputting the information from the playback process circuit 33 to the unillustrated speaker and monitor of the television receiver 200.

The control device 4 controls the operation of the optical pickup 1 and the drive device 5 based on the instruction operation accepted via the operation portion 7. The control device 4 includes the system controller 41 and the driver IC 42. The system controller 41 accepts information from the operation portion 7 and transmits it to the DSP 32, and transmits information from the DSP 32 to the display portion 6. Moreover, the system controller 41 accepts image information, sound information, or the like, from the television receiver 200 via the interface portion 8, and outputs it to the DSP 32.

Based on an instruction from the DSP 32, the driver IC 42 controls the operation of the optical pickup 1 and the drive device 5. Specifically, the driver IC 42 controls a current supplied to the LD 11 provided in the optical pickup 1, and controls the operation of the thread motor 51 and a spindle motor 52 forming the drive device 5.

The drive device 5 includes the thread motor 51 and the spindle motor 52. The thread motor 51 moves the optical pickup 1 in the direction of the radius of the optical disc 2 and in the vertical direction based on an instruction from the driver IC 42. The spindle motor 52 rotates the optical disc 2 based on an instruction from the driver IC 42.

The display portion 6 includes an LCD (liquid crystal display) or the like, and displays information from the DSP 32 so that it can be viewed from the outside. The operation portion 7 includes different operation buttons and the like. The operation section 7 accepts operation from the user, and outputs a corresponding operation signal to the DSP 32. The interface portion 8 accepts information such as image information and sound information from the television receiver 200, and outputs it to the system controller 41.

Figure 2:
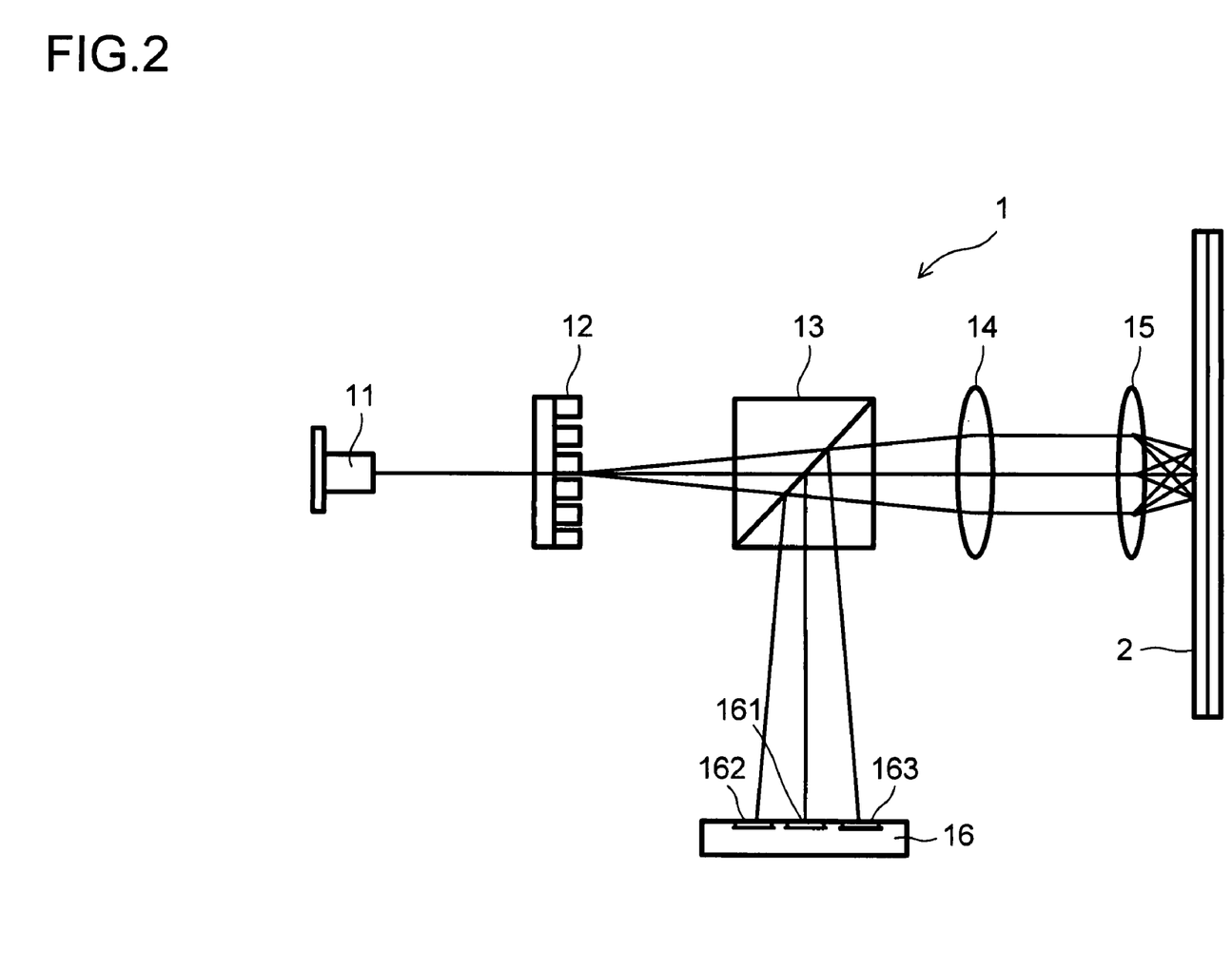
FIG. 2 is a configuration diagram to show an example of the configuration of the optical pickup shown in FIG. 1.

FIG. 2 is a configuration diagram to show an example of the configuration of the optical pickup 1 shown in FIG. 1. The optical pickup 1 includes, in addition to the LD 11 described by using FIG. 1, a diffracting portion 12, a beam splitter 13, a collimator lens 14, an objective lens 15, a split photo detector 16, and an unillustrated tracking error signal generation circuit 17 (see FIG. 5). The diffracting portion (grating) 12 diffracts the laser light emitted from the LD 11, and outputs the diffracted light to the beam splitter 13.

The beam splitter 13 allows the diffracted light outputted from the diffracting portion 12 to pass therethrough, and reflects the reflected light from the optical disc 2 toward the split photo detector 16. The collimator lens 14 produces parallel beams of light from the laser light incident from the LD 11 via the diffracting portion 12 and the beam splitter 13. The objective lens 15 focuses the laser light onto the signal surface of the optical disc 2.

The split photo detector 16 receives the reflected light from the optical disc 2 via the objective lens 15, the collimator lens 14, and the beam splitter 13, and outputs an electrical signal corresponding to the amount of received light. The unillustrated tracking error signal generation circuit 17 produces a tracking error signal based on the electrical signals from the split photo detector 16.

Figure 3:
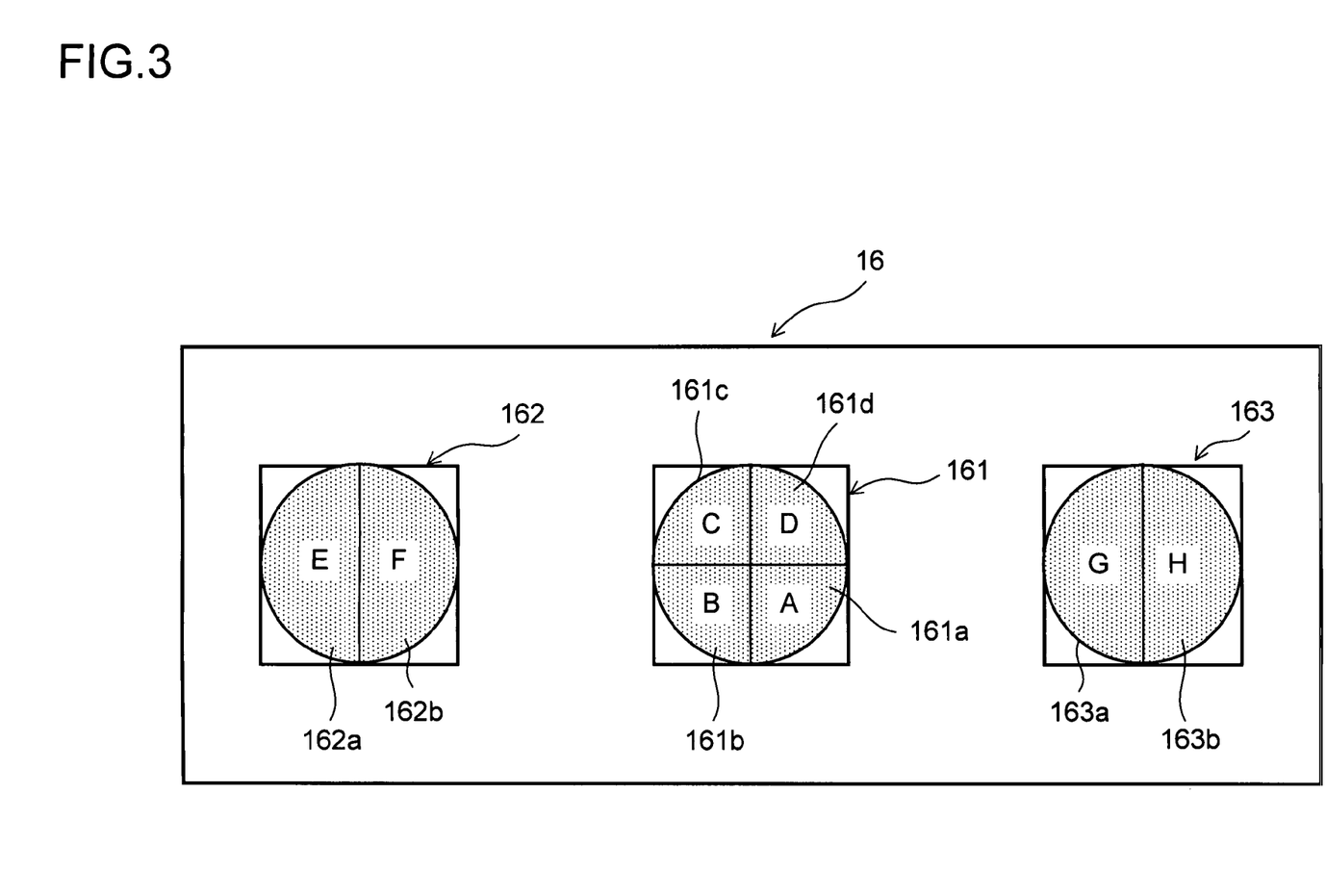
FIG. 3 is a plan view to show an example of the split photo detector shown in FIG. 2.

FIG. 3 is a plan view to show an example of the split photo detector 16 shown in FIG. 2. The split photo detector 16 includes a main photo detector 161 and sub photo detectors 162 and 163. The main photo detector 161 is split crosswise as well as lengthwise into four equal parts: photo detectors 161a, 161b, 161c, and 161d, and receives zeroth-order diffracted light (main beam). The sub photo detector 162 is split lengthwise into two equal parts: photo detectors 162a and 162b, and the sub photo detector 163 is split lengthwise into two equal parts: photo detectors 163a and 163b. The sub photo detectors 162 and 163 receive first-order diffracted light (sub beam).

Figure 5:
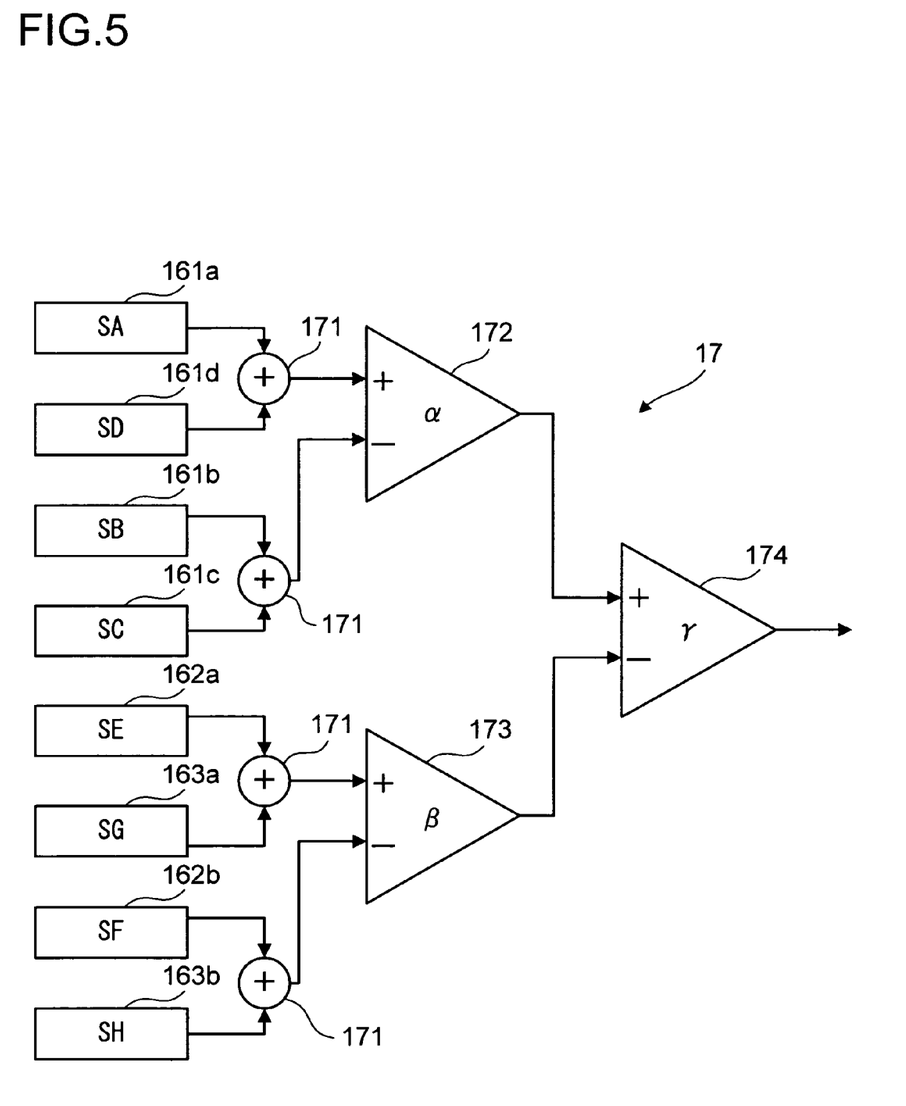
FIG. 5 is a configuration diagram to show an example of the tracking error signal generation circuit provided in the proper place in the optical pickup shown in FIG. 1.

The photo detectors 161a, 161b, 161c, and 161d forming the main photo detector 161 respectively produce electrical signals SA, SB, SC, and SD corresponding to the amount of received light, and output them to the tracking error signal generation circuit 17 (see FIG. 5). The photo detectors 162a and 162b forming the sub photo detector 162 respectively produce electrical signals SE and SF corresponding to the amount of received light, and output them to the tracking error signal generation circuit 17 (see FIG. 5). The photo detectors 163a and 163b forming the sub photo detector 163 respectively produce electrical signals SG and SH corresponding to the amount of received light, and output them to the tracking error signal generation circuit 17 (see FIG. 5).

Figure 4:
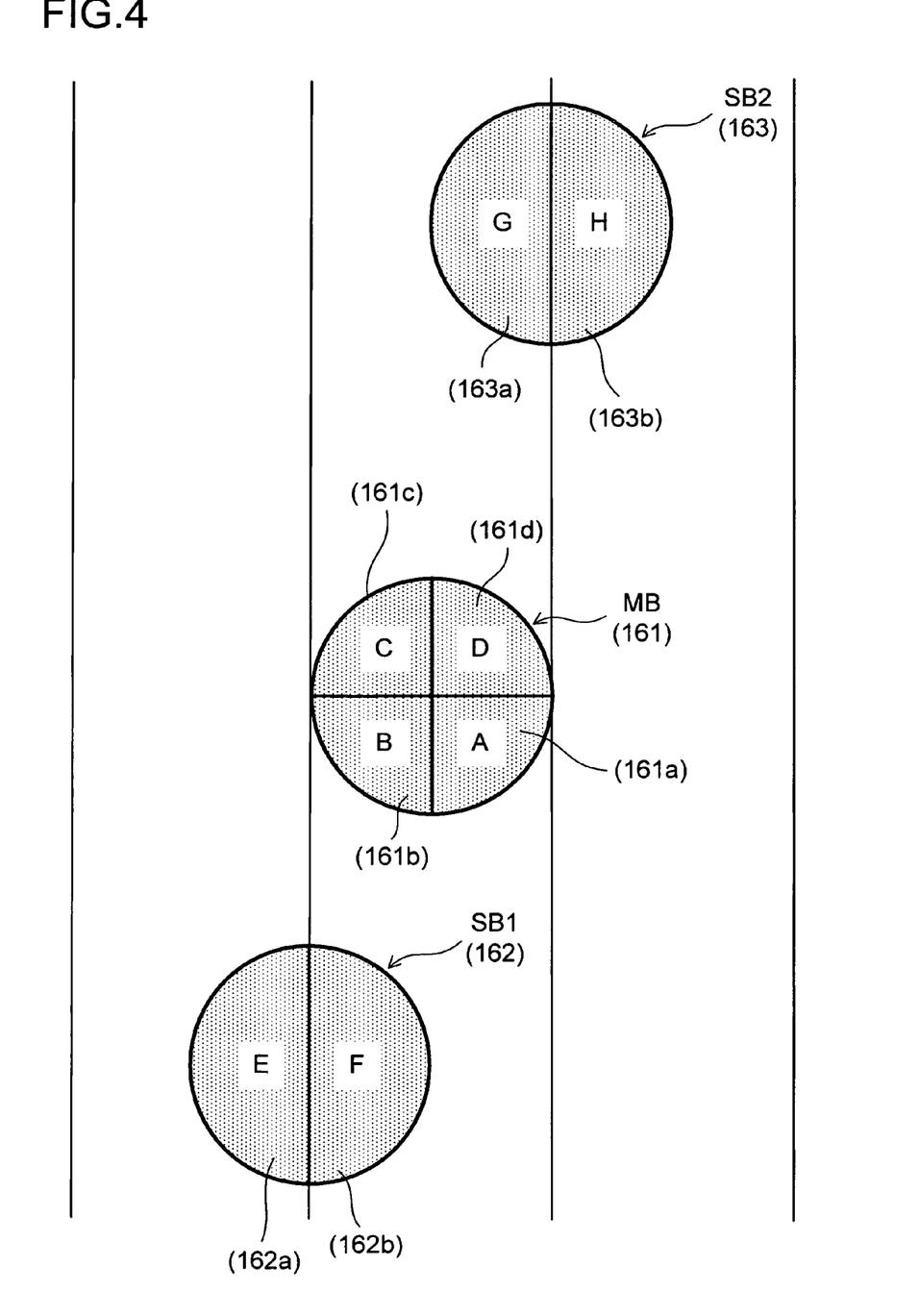
FIG. 4 is a diagram conceptually to show zeroth-order diffracted light and first-order diffracted light shone onto the optical disc.

FIG. 4 is a diagram conceptually to show the zeroth-order diffracted light and the first-order diffracted light shone onto the optical disc 2. The laser light emitted from the LD 11 shown in FIG. 2 is split into three beams by the diffracting portion 12 shown in FIG. 2, such that, as shown in FIG. 4, one main beam MB and two sub beams SB1 and SB2 are shone onto a track on the optical disc 2 so as to be substantially parallel to the track with small angle deviations. That is, the sub beams SB1 and SB2 are shone while being shifted from the main beam by nearly half a track pitch.

FIG. 4 is a diagram to show a state in which the main beam MB and the sub beams SB1 and SB2 are focused on the optical disc 2 by the objective lens 15 shown in FIG. 2. In this figure, the main beam MB is shone onto a groove, and the sub beams SB1 and SB2 are shone onto grooves.

In addition, the main beam MB is received by the photo detectors 161a, 161b, 161c, and 161d of the main photo detector 161 shown in FIG. 3, whereby the electrical signals SA, SB, SC, and SD corresponding to the amount of received light are produced. The sub beam SB1 is received by the photo detectors 162a and 162b of the sub photo detector 162 shown in FIG. 3, whereby the electrical signals SE and SF corresponding to the amount of received light are produced. The sub beam SB2 is received by the photo detectors 163a and 163b of the sub photo detector 163 shown in FIG. 3, whereby the electrical signals SG and SH corresponding to the amount of received light are produced.

FIG. 5 is a configuration diagram to show an example of the tracking error signal generation circuit 17 provided in the proper place in the optical pickup 1 shown in FIG. 1. To the tracking error signal generation circuit 17, eight electrical signals SA, SB, SC, SD, SE, SF, SC, and SH from the split photo detector 16 are inputted. The tracking error signal generation circuit 17 includes four addition circuits 171, a main differential amplifier 172, a sub differential amplifier 173, and a composite differential amplifier 174.

The four addition circuits 171 (corresponding to part of a first signal generating portion and a part of a second signal generating portion) perform addition of two electrical signals SA and SD, two electrical signals SB and SC, two electrical signals SE and SC, and two electrical signals SF and SH, and output the resultant signals to the main differential amplifier 172 or the sub differential amplifier 173.

The main differential amplifier 172 (corresponding to part of the first signal generating portion) is a differential amplifier capable of setting a gain $\alpha$. The main differential amplifier 172 produces a first error signal TE1 (TE1=(SA+SD)−(SB+SC)) from four electrical signals corresponding to the main beam MB (see FIG. 4) of the reflected light from the optical disc 2, multiplies it by a previously set first gain $\alpha$, and outputs the resultant signal to the composite differential amplifier 174 as a main error signal MTE (=$\alpha \times$TE1).

The sub differential amplifier 173 (corresponding to part of the second signal generating portion) is a differential amplifier capable of setting a gain $\beta$. The sub differential amplifier 173 produces a second error signal TE2 (TE2=(SE+SG)−(SF+SH)) from four electrical signals corresponding to the sub beams SB1 and SB2 (see FIG. 4) of the reflected light from the optical disc 2, multiplies it by a previously set second gain $\beta$, and outputs the resultant signal to the composite differential amplifier 174 as a sub error signal STE (=$\beta \times$TE2).

The composite differential amplifier 174 (corresponding to a third signal generating portion) is a differential amplifier capable of setting a gain γ. The composite differential amplifier 174 produces a tracking error signal TE by obtaining a difference between the main error signal MTE outputted from the main differential amplifier 172 and the sub error signal STE outputted from the sub differential amplifier 173 by subtracting the latter from the former, and multiplying it by a previously set third gain γ (for example, "1"). That is, the tracking error signal TE is given by the following formula (1) by using the electrical signals SA, SB, SC, SD, SE, SF, SG, and SH outputted from the split photo detector 16.

$$TE=\gamma\times(\alpha\times((SA+SD)-(SB+SC))-\beta\times((SE+SG)-(SF+SH))) \quad (1)$$

Figure 6:
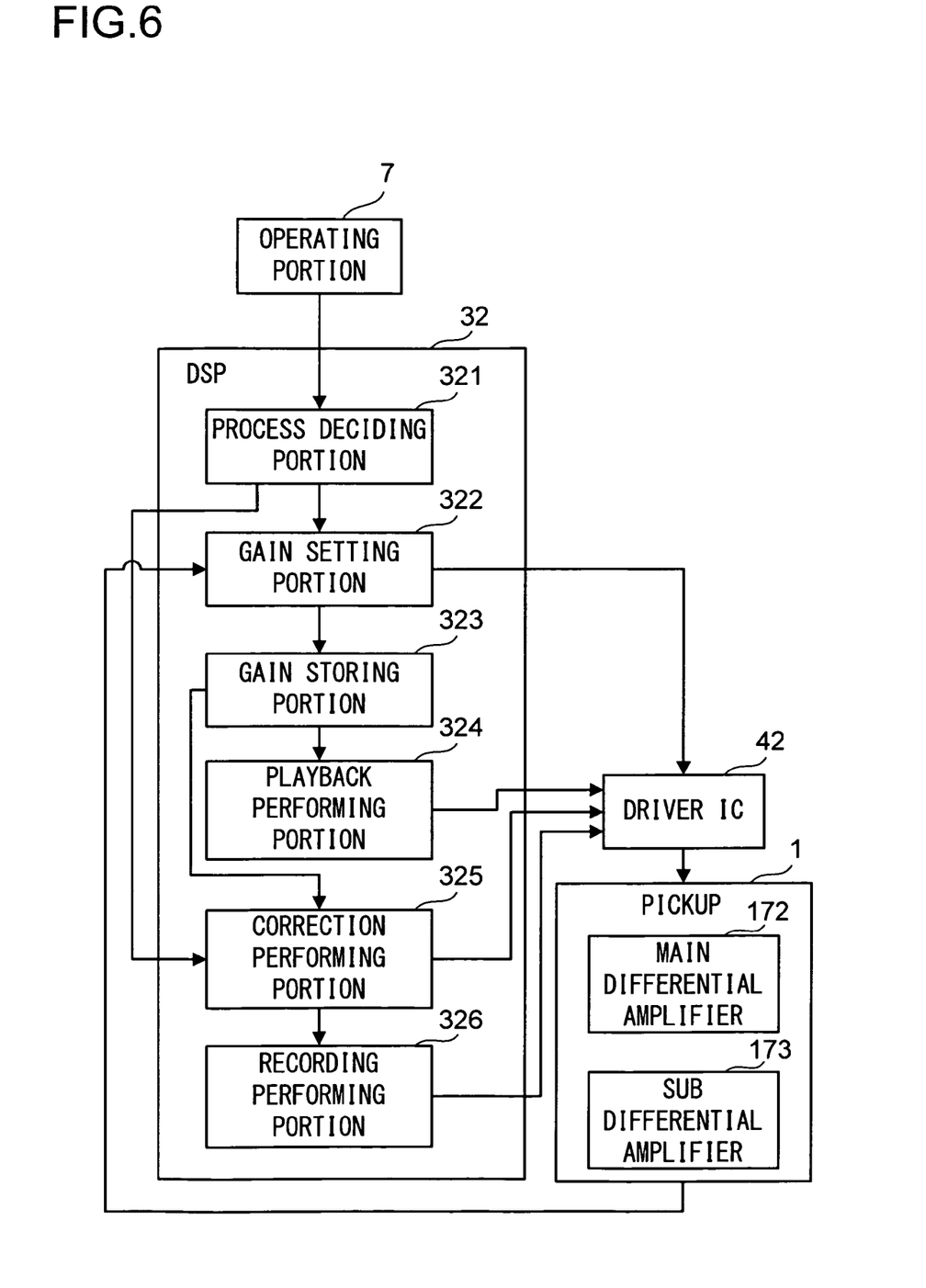
FIG. 6 is a functional block diagram to show an example of the configuration of a principal portion (primarily of a DSP) of the DVD recorder according to the invention.

FIG. 6 is a functional block diagram to show an example of the configuration of a principal portion (primarily of the DSP 32) of the DVD recorder 100 according to the invention. The DSP 32 includes unillustrated MPU (micro processing unit), RAM (random-access memory), and ROM (read-only memory). The DSP 32 functionally includes a PROCESS DECIDING PORTION 321, a gain setting portion 322, a gain storing portion 323, a playback performing portion 324, a correction performing portion 325, and a recording performing portion 326.

In this case, the MPU functions as a functional portion such as the PROCESS DECIDING PORTION 321, the gain setting portion 322, the playback performing portion 324, the correction performing portion 325, or the recording performing portion 326 by reading a program previously stored in the ROM, or the like, and executing it, and makes the RAM function as a functional portion such as the gain storing portion 323, or the like.

Of various data stored in the RAM or ROM, data that can be stored in a removable recording medium may be made readable by a driver such as a hard disk drive, an optical disc drive, a flexible disk drive, a silicon disk drive, or a cassette media reader. In such a case, the recording medium is, for example, a hard disk, an optical disc, a flexible disk, a CD (Compact Disc), a DVD, or a semiconductor memory.

The gain storing portion 323 (corresponding to a gain storing portion) previously stores the first gain α and the second gain β. The first gain α and the second gain β stored in the gain storing portion 323 are set by the gain setting portion 322, and read by the correction performing portion 325.

The PROCESS DECIDING PORTION 321 accepts an operation input from the user via the operation portion 7, and, based on the accepted operation input, decides whether to perform playback process or to perform RECORDING PROCESS.

If the PROCESS DECIDING PORTION 321 decides to perform playback process, the gain setting portion 322 (corresponding to a gain setting portion) determines appropriate values of the first gain α and the second gain β, stores the first gain α and the second gain β thus determined in the gain storing portion 323, and sets them in the main differential amplifier 172 and the sub differential amplifier 173, respectively, of the optical pickup 1 via the driver IC 42.

The playback performing portion 324 reads the image information or the like stored in the optical disc 2 via the optical pickup 1, and outputs it to the speaker and the monitor of the television receiver 200 (performs playback process for the optical disc 2).

If the PROCESS DECIDING PORTION 321 decides to perform recording process, the correction performing portion 325 (corresponding to a correction performing portion) reads the first gain α and the second gain β stored in the gain storing portion 323, corrects at least one of them, and sets them in the main differential amplifier 172 and the sub differential amplifier 173, respectively, of the optical pickup 1.

Specifically, in this case, the correction performing portion 325 corrects the first gain α by multiplying the first gain α stored in the gain storing portion 323 by a predetermined correction value (for example, a value in the range of 0.88 to 0.92: in this case, 0.9), and sets it in the main differential amplifier 172. On the other hand, the correction performing portion 325 sets the second gain β stored in the gain storing portion 323 in the sub differential amplifier 173.

The recording performing portion 326 records the image information or the like accepted from the television receiver 200 on the optical disc 2 via the optical pickup 1 (performs recording process for the optical disc 2).

Figure 7A:
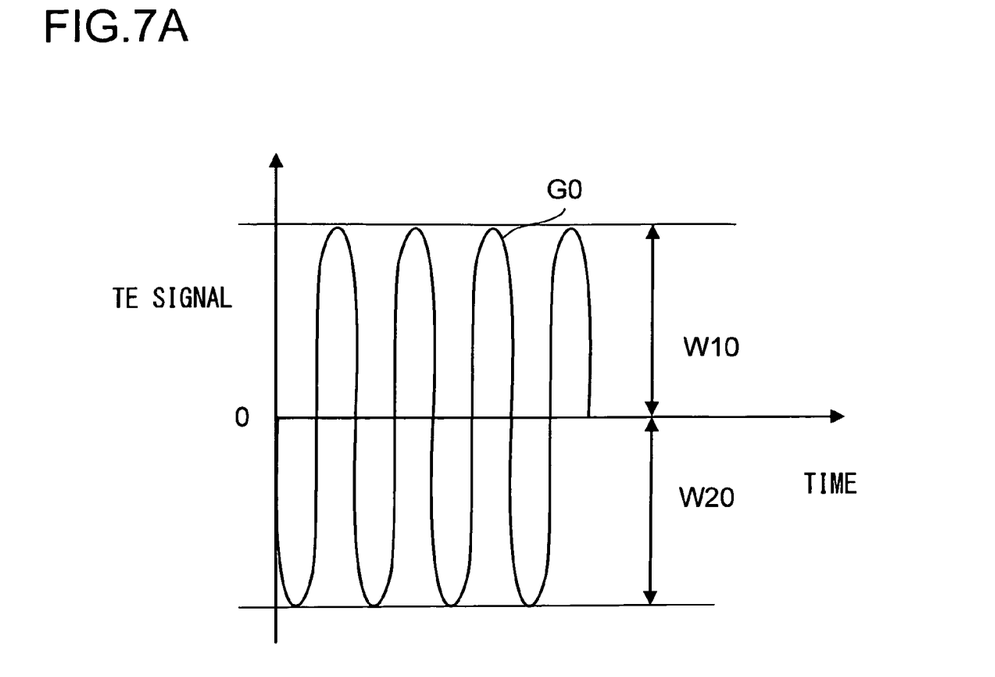
FIG. 7A is a graph to show an example of a tracking error signal TE at the time of playback.
Figure 7B:
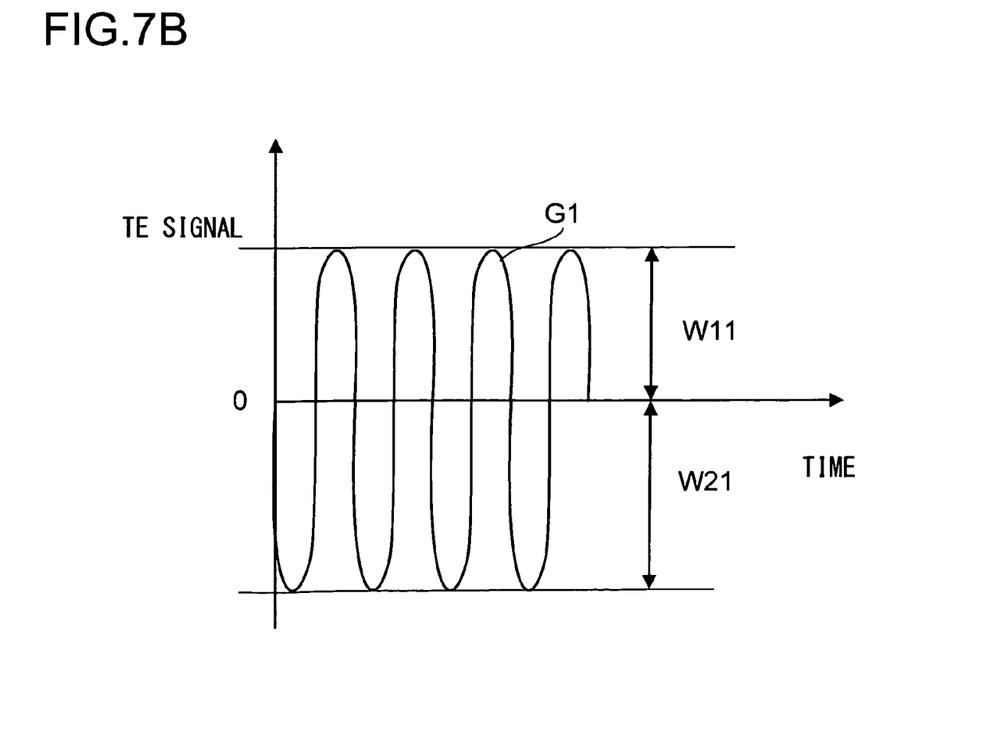
FIG. 7B is a graph to show an example of a tracking error signal TE at the time of recording in a conventional DVD recorder.

FIG. 7A is a graph G0 to show an example of the tracking error signal TE at the time of playback, and FIG. 7B is a graph G1 to show an example of the tracking error signal TE at the time of recording in a conventional DVD recorder. In the graphs G0 and G1, the horizontal axis represents time, and the vertical axis represents the tracking error signal TE outputted from the composite differential amplifier 174 shown in FIG. 5.

At the time of playback, the gain setting portion 322 determines appropriate values of the first gain α and the second gain β, and sets them in the main differential amplifier 172 and the sub differential amplifier 173, respectively. As a result, as shown in FIG. 7A, the amplitude W10 of the tracking error signal TE in the positive direction and the amplitude W20 thereof in the negative direction are substantially the same in value, making it possible to obtain an appropriate tracking error signal TE. This helps stabilize accuracy of tracking servo.

By contrast, in the conventional DVD recorder, at the time of recording, the first gain α and the second gain β determined by the gain setting portion 322 at the time of playback are set in the main differential amplifier 172 and the sub differential amplifier 173, respectively. As a result, as shown in FIG. 7B, the amplitude W11 of the tracking error signal TE in the positive direction is smaller than the amplitude W21 thereof in the negative direction, leading to disruption of a balance of the tracking error signal TE. This results in the instability of tracking servo.

That is, as shown in FIG. 7B, the balance of the tracking error signal TE is disrupted not only because the intensity of laser light shone onto the optical disc 2 is different when playback is performed and when recording is performed, but also because, since the optical disc 2 is a DVD having two recordable layers: a zeroth layer and a first layer, the tracking error signal TE is affected by interfering light from adjacent layers.

Therefore, in the present invention, at the time of recording, the correction performing portion 325 corrects the first gain α by multiplying the first gain α stored in the gain storing portion 323 by a predetermined correction value (for example, a value in the range of 0.88 to 0.92: in this case, 0.9), and sets it in the main differential amplifier 172. This helps maintain balance of the tracking error signal TE (helps obtain a tracking error signal TE shown in FIG. 7A), making it possible to stabilize the accuracy of tracking servo.

Figure 8:
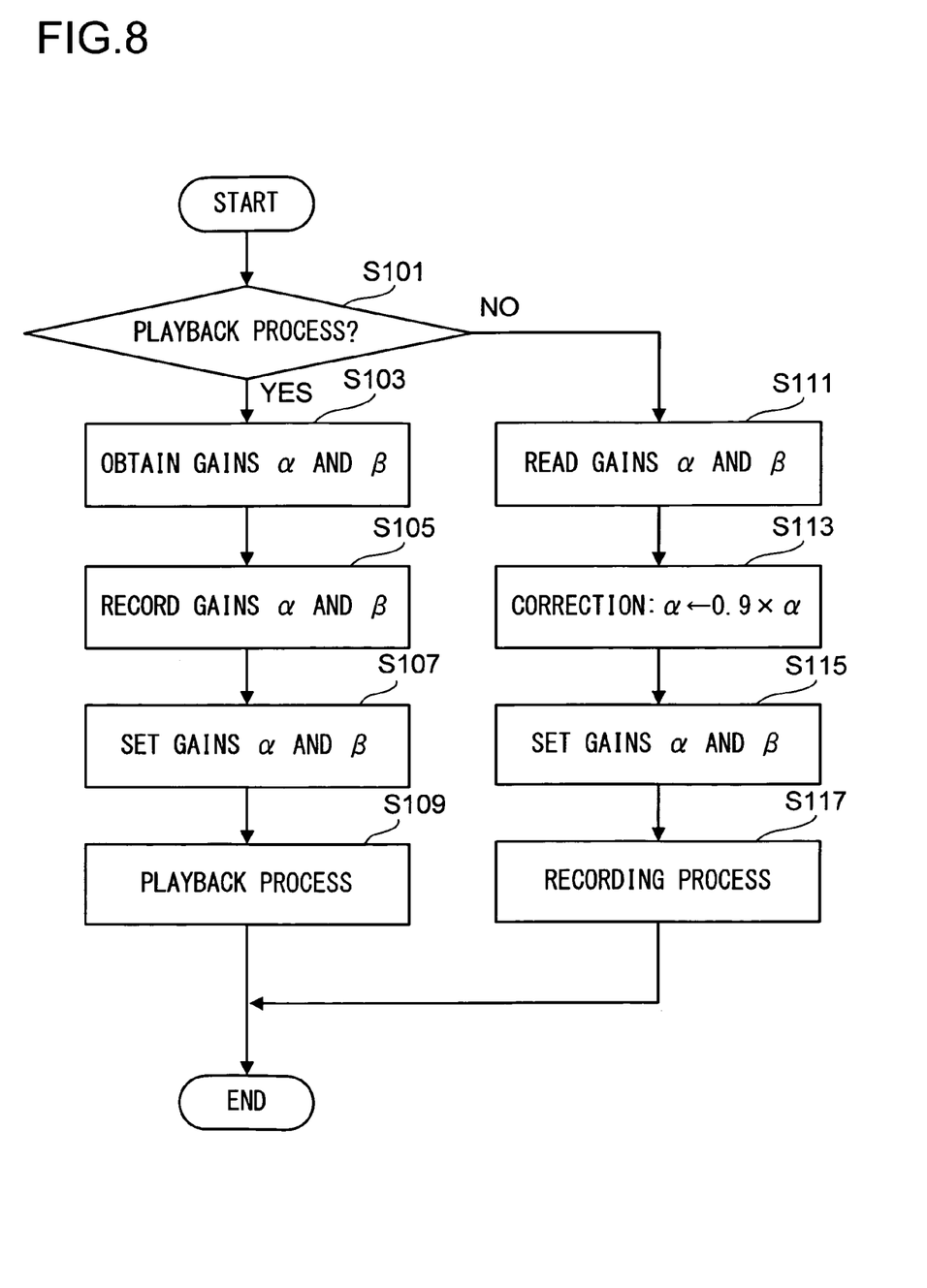
FIG. 8 is a flow chart to show an example of operation of the DVD recorder according to the invention.

FIG. 8 is a flow chart to show an example of operation of the DVD recorder 100 according to the invention. First, the PROCESS DECIDING PORTION 321 decides whether or not to perform playback process (S101). If the decision is made to perform playback process (YES in S101), the gain setting portion 322 determines appropriate values of the first gain α and the second gain β (S103). Then, the gain setting portion 322 records the first gain α and the second gain β determined in step S103 in the gain storing portion 323 (S105).

Next, the gain setting portion 322 sets the first gain α and the second gain β determined in step S103 in the main differential amplifier 172 and the sub differential amplifier 173, respectively (S107). Then, the playback performing portion 324 performs playback process for the optical disc 2 (S109), and processing is ended.

If NO in step S101 (if decision is made to perform recording process), the correction performing portion 325 reads the first gain α and the second gain β stored in the gain storing portion 323 (S111). Then, the correction performing portion 325 corrects the first gain α by multiplying the first gain α read in step S111 by a predetermined correction value (in this case, 0.9) (S113).

Next, the correction performing portion 325 sets the first gain α corrected in step S113 in the main differential amplifier 172, and sets the second gain β read in step S111 in the sub differential amplifier 173 (S115). Then, the recording performing portion 326 performs recording process for the optical disc 2 (S117), and processing is ended.

As described above, the main differential amplifier 172 produces the first error signal TE1 from four electrical signals SA, SB, SC, and SD corresponding to the main beam MB of the reflected light, multiplies it by a previously set first gain α, and outputs the main error signal MTE (=α×TE1). The sub differential amplifier 173 produces the second error signal TE2 from four electrical signals SE, SF, SG, and SH corresponding to the sub beams SB1 and SB2 of the reflected light, multiplies it by a previously set second gain β, and outputs the sub error signal STE (=β×TE2). The composite differential amplifier 174 obtains a difference between the main error signal MTE outputted from the main differential amplifier 172 and the sub error signal STE outputted from the sub differential amplifier 173 by subtracting the latter from the former. In this way, the tracking error signal TE is produced. When playback of the optical disc 2 is performed, appropriate values of the first gain α and the second gain β are determined, and the first gain α and second gain β thus determined are recorded in the gain storing portion 323, and are set in the main differential amplifier 172 and the sub differential amplifier 173, respectively. In addition, when recording on the optical disc 2 is performed, the first gain α and the second gain β stored in the gain storing portion 323 are read, and, after at least one of them (in this case, the first gain α) is corrected, they are set in the main differential amplifier 172 and the sub differential amplifier 173, respectively. This makes it possible to stabilize the accuracy of tracking servo.

That is, when playback of the optical disc 2 is performed, appropriate values of the first gain α and the second gain β are determined, and the first gain α and the second gain β thus determined are recorded in the gain storing portion 323 and are set in the main differential amplifier 172 and the sub differential amplifier 173, respectively; when recording on the optical disc 2 is performed, the first gain cc and the second gain β stored in the gain storing portion 323 are read, and, after at least one of them (in this case, the first gain α) is corrected, they are set in the main differential amplifier 172 and the sub differential amplifier 173, respectively. Thus, by performing appropriate correction, it is possible to make the first gain α and the second gain β have an appropriate value even when recording on the optical disc 2 is performed. This helps stabilize the accuracy of tracking servo.

In addition, in the above correction, the first gain α is corrected by multiplying it by a predetermined correction value (in this case, 0.9), and is set in the main differential amplifier 172. As a result, by setting the correction value at an appropriate value (for example, 0.9), it is possible to stabilize the accuracy of tracking servo with a simple configuration.

Furthermore, since the above correction value is a value in the range of 0.88 to 0.92 (in this case, 0.9), it is possible to stabilize the accuracy of tracking servo with a simple configuration.

That is, in a case where recording is performed on the optical disc 2, using the gain value set at the playback for recording may cause disruption of a balance of the tracking error signal TE (FIG. 7B). To avoid this, the first gain α is corrected by multiplying it by a correction value set in the range of 0.88 to 0.92. This makes it possible to obtain an appropriate tracking error signal TE (see FIG. 7A), and thus makes it possible to stabilize the accuracy of tracking servo with a simple configuration.

In addition, since the optical disc 2 is a DVD having two recordable layers: a zeroth layer and a first layer, the balance of the tracking error signal TE is disrupted at the time of recording (see FIG. 7B) due to, for example, the influence of interfering light from adjacent layers. To avoid this, at least one of the first gain α and the second gain β (in this case, the first gain α) is corrected. This helps further stabilize the accuracy of tracking servo.

The present invention can be applied to the following configurations.

(A) The above embodiment deals with a case where the optical disc recording and playback apparatus is a DVD recorder 100. However, the optical disc recording and playback apparatus may be of any other type as long as the optical disc recording and playback apparatus is an apparatus that records information on an optical disc, and reads information stored in the optical disc and plays it back. For example, the optical disc recording and playback apparatus may be a personal computer capable of performing recording on a DVD and playback of a DVD.

(B) The above embodiment deals with a case where the DSP 32 functions as a functional portion such as the PROCESS DECIDING PORTION 321, the gain setting portion 322, the playback performing portion 324, the correction performing portion 325, and the recording performing portion 326. However, it is also possible to realize at least one functional portion of the PROCESS DECIDING PORTION 321, the gain setting portion 322, the playback performing portion 324, the correction performing portion 325, and the recording performing portion 326 with hardware such as a circuit.

(C) The above embodiment deals with a case where the optical disc 2 is a DL DVD. However, the optical disc 2 may be a DVD of any other type (for example, a DVD-RAM, or the like).

(D) The above embodiment deals with a case where the correction performing portion 325 corrects the first gain α by multiplying the first gain α stored in the gain storing portion 323 by a predetermined correction value, and sets it in the main differential amplifier 172. However, it is also possible to adopt a configuration in which the correction performing portion 325 corrects the second gain β by multiplying the second gain β stored in the gain storing portion 323 by a predetermined correction value (for example, 1.1), and sets it in the sub differential amplifier 173. Moreover, it is also possible to adopt a configuration in which the correction performing portion 325 corrects both the first gain α and the second gain β.

What is claimed is:

1. An optical disc recording and playback apparatus comprising: a laser light source irradiating an optical disc with laser light; and an optical pickup converting reflected light from the optical disc into a plurality of electrical signals via a split photo detector, the optical disc recording and playback apparatus recording information on the optical disc, and reading information stored in the optical disc and playing back the read information, wherein the optical disc recording and playback apparatus comprises:

a first signal generating portion producing a first error signal from the plurality of electrical signals corresponding to a main beam of the reflected light, multiplying the first error signal by a previously set first gain, and outputting a resultant signal;

a second signal generating portion producing a second error signal from the plurality of electrical signals corresponding to a sub beam of the reflected light, multiplying the second error signal by a previously set second gain, and outputting a resultant signal;

a third signal generating portion producing a tracking error signal by obtaining a difference between the first error signal and the second error signal by subtracting the second error signal from the first error signal;

a gain storing portion previously storing the first gain and the second gain;

a gain setting portion determining appropriate values of the first gain and the second gain when playback of the optical disc is performed, recording the first gain and the second gain thus determined in the gain storing portion, and setting the first gain and the second gain in the first signal generating portion and the second signal generating portion, respectively; and a correction performing portion reading, when recording on the optical disc is performed, the first gain and the second gain stored in the gain storing portion, correcting at least one of the first gain and the second gain, and setting the first gain and the second gain in the first signal generating portion and the second signal generating portion, respectively.

2. The optical disc recording and playback apparatus of claim 1, wherein the correction performing portion corrects the first gain by multiplying the first gain stored in the gain storing portion by a predetermined correction value, and sets the first gain thus corrected in the first signal generating portion.

3. The optical disc recording and playback apparatus of claim 2, wherein the predetermined correction value is a value in a range of 0.88 to 0.92.

4. The optical disc recording and playback apparatus of claim 1, wherein the correction performing portion corrects the second gain by multiplying the second gain stored in the gain storing portion by a predetermined correction value, and sets the second gain thus corrected in the second signal generating portion.

5. The optical disc recording and playback apparatus of claim 1, wherein the optical disc is a DVD (Digital Versatile Disc) having two recordable layers: a zeroth layer and a first layer.

* * * * *